United States Patent [19]

Klug

[11] 3,754,877

[45] Aug. 28, 1973

[54] GELLED FUEL COMPOSITIONS

[75] Inventor: Eugene D. Klug, Wilmington, Del.

[73] Assignee: Hercules Incorporated, Wilmington, Del.

[22] Filed: Feb. 4, 1972

[21] Appl. No.: 223,762

[52] U.S. Cl. ...................... 44/7 B, 44/7 C, 149/109
[51] Int. Cl. ................................................ C10l 7/04
[58] Field of Search ...................... 44/7 C, 7 B, 7 D, 44/7 R, 7 A; 149/17, 18, 109

[56] References Cited
UNITED STATES PATENTS 2,838,384  6/1958  Sloan et al. ............................ 44/7 B
3,183,068  5/1965  Monick .................................. 44/7 B Primary Examiner—Benjamin R. Padgett
Attorney—William S. Alexander et al.

[57] ABSTRACT

Disclosed are combustible gels comprised of an aliphatic alcohol and a crosslinked olefin-modified hydroxyalkyl cellulose. These gels find utility as fuels for chafing dishes and the like, as flares, and for decorative lighting purposes. Color producing inorganic materials can be added for pyrotechnic applications.

10 Claims, No Drawings

GELLED FUEL COMPOSITIONS

This invention relates to gels based on an alcohol and an alcohol-soluble cellulose derivative. In a specific embodiment it relates to a gelled fuel based on such ingredients.

A well-known, commercially available gel fuel widely used today is based on a lower molecular weight alcohol such as ethanol or methanol gelled by special, proprietary techniques with, e.g., nitrocellulose. While materials of this type have enjoyed considerable commercial success, there is some room for improvement over them. One obvious shortcoming of these materials is the use therein of nitrocellulose with the attendant handling problems due to its flammability. Another shortcoming of the prior materials is that they exhibit syneresis upon standing for an extended time period. Thus, a freshly opened can of gelled fuel may contain a layer of free liquid alcohol on its surface which must be discarded prior to igniting the fuel or a hazardous flare-up will be experienced. Another disadvantage of the prior art gelled fuels is that water must be added to the mixtures to promote gelation. The product which results is highly corrosive to metal and must be packaged in rustproof cans.

According to this invention a new and improved gelled fuel composition has been discovered which substantially avoids the problems mentioned above. Specifically, the invention is a gelled fuel composition comprised of a lower aliphatic alcohol containing about 0.2 to 2% by weight of crosslinked olefin-modified hydroxyalkyl cellulose. The precise concentration selected can vary depending on the characteristics of the olefin-modified hydroxyalkyl cellulose and the degree of crosslinking effected. Gelled fuels of the type contemplated herein are normally employed in the form of relatively stiff, relatively non-flowable gels.

The olefin-modified hydroxyalkyl cellulose which is employed to gel the alcohol according to this invention is hydroxyethyl or hydroxypropyl cellulose or a mixed ether based on these hydroxyalkyl substituents with each other or with a hydroxybutyl substituent and therein a small amount of olefin functionality.

The table below lists broad and preferred hydroxyalkyl M.S. ranges for typical hydroxyalkyl substituents useful in preparing gels according to this invention.

| Ether | M.S. Range Broad | Preferred |
|---|---|---|
| Hydroxyethyl (HE) | 1.5 to 5 | 1.8 to 3 |
| Hydroxypropyl (HP) | 2 to 10 | 3 to 5 |
| Hydroxyethyl hydroxypropyl -HE-HP | 0.05 to 2 | 0.1 to 1 |
|  | 2 to 10 | 2.5 to 4.5 |
| Hydroxybutyl hydroxypropyl -HB-HP | 0.05 to 2 | 0.1 to 1 |
|  | 2 to 10 | 2.5 to 4.5 |

In all cases, the D.S. of the olefin functionality is more critical than the hydroxyalkyl M.S. and should be about 0.02 to 1 and preferably about 0.05 to 0.4. The hydroxyalkyl substitution is chosen to give a product soluble in the alcohol fuel. Pure HEC is not soluble in alcohol of greater than 80% concentration.

These mixed ethers are known materials which can readily be prepared according to methods taught, e.g., in U.S. Pat. Nos. 3,251,825 and 3,143,516. In general, the process comprises treating alkali cellulose with a mixture of hydroxyalkylation agents and an unsaturated alkylating agent for a time sufficient to effect the desired amount of substitution. Useful hydroxyalkylation agents are, e.g., ethylene oxide, propylene oxide, and 1,2-butylene oxide and ethylene chlorohydrin or propylene chlorohydrin.

The sources of unsaturation can be any compounds having ethylenic unsaturation and either epoxide or halide groups. Several such compounds and the derivative formed by them are listed in the table below:

| Reagent | Group added to cellulose |
|---|---|
| allyl halides | allyl- |
| methallyl halides | methallyl- |
| vinyl benzyl halides | vinyl benzyl- |
| butadiene monoxide | 2-hydroxy-3-butenyl- |
| allyl glycidyl ether | 2-hydroxy-3-alloxy-n-propyl- |

This list is exemplary but by no means exhaustive.

In order to form a sufficiently rigid gel for the purposes of this invention, the olefin-modified hydroxyalkyl cellulose must be crosslinked. A variety of techniques are known to the art for effecting crosslinking through the olefin group. Substantially any of these crosslinking techniques can be employed which are adaptable to a solvent system. For example, solutions of allyl hydroxyalkyl cellulose can be gelled by the addition of free radical type polymerization catalysts such as benzoyl peroxide, cumene hydroperoxide, tertiary butyl hydroperoxide etc. Such methods are described in U.S. Pat. No. 3,251,825 and U.S. Pat. No. 3,071,572.

A preferred crosslinking technique is the use of a polyfunctional nitrile N-oxide or nitrile imine. Compounds of this type and the appropriate crosslinking techniques are taught in e.g., U.S. Pat. Nos. 3,576,908, and 3,390,204. The preferred crosslinkers are the nitrile N-oxides. As most of these materials are unstable, they are normally prepared in situ by treating a precursor material such as the corresponding hydroximoyl halide with an alkaline material. Typical hydroximoyl halides which can be employed and their corresponding nitrile N-oxides include those in the following table.

| | Hydroximoyl halide | Formula | Nitrile N-oxide | Formula |
|---|---|---|---|---|
| 1 | Dichloroglyoxime | H—O—N=C—C=N—OH<br>　　　　　Cl　Cl | Cyanogen N,N'-dioxide | ⊖O—N⁺≡C—C≡N⁺—O⊖ |
| 2 | Terephthalo-bis (hydroximoyl chloride) | Cl<br>HON=C—⟨C₆H₄⟩—C=N—OH<br>　　　　　　　　Cl | Terephthalo-bis (nitrile N-oxide) | ⊖O—N⁺≡C—⟨C₆H₄⟩—C≡N⁺—O⊖ |
| 3 | 4,4'-bis(phenylglyoxylohydroximoylchloride) | HON=C—⟨C₆H₄⟩—⟨C₆H₄⟩—C=N—OH<br>　Cl O　　　　　　O Cl | 4,4'-bis(benzoyl carbonitrile N-oxide) | ⊖O—N⁺≡C—⟨C₆H₄⟩—⟨C₆H₄⟩—C≡N⁺—O⊖<br>　　　O　　　　　　　O |

A preferred crosslinker is that represented by number 1 in the table above, cyanogen N,N'-dioxide.

A number of alkaline materials can be employed to 1 the nitrile oxide precursor to a nitrile oxide, e.g., inorganic bases such as hydroxides, carbonates, and bicarbonates of sodium, potassium, etc.; organic bases such as primary, secondary or tertiary amines and quaternary ammonium hydroxides; epoxides which can add hydrogen chloride such as propylene oxide, butylene oxide and butadiene monoxide; and salts of lead, silver, and mercury which form insoluble halides such as their nitrates. Apparently the basic compound acts as a HCl acceptor and promotes dehydrohalogenation of the hydroximoyl halide and an immediate reaction takes place, tying up the liberated hydrogen halide. This reaction, in most cases, takes place at relatively low temperatures, i.e., about 0° to 150°C. and preferably between about 20° and 100°C.

Crosslinking of the olefin-modified hydroxyalkyl cellulose is carried out by adding the nitrile oxide precursor to a solution of the cellulose derivative in the alcohol to be gelled. Base is added to this solution with stirring to effect crosslinking. The base can be added before, after or at the same time as the nitrile oxide precursor is added. Gelation of the solution takes place substantially simultaneously with crosslinking. The rate at which crosslinking and gelation take place can be varied from a few seconds to several days by varying the concentration of cross-linker, bases and temperature. In most cases, a crosslinker concentration of about 0.2 to 10 percent based on the weight of the cellulose derivative will be employed.

Gels according to this invention can be prepared from any of the lower aliphatic alcohols having one to about five carbon atoms, e.g., methanol, ethanol, propanol, isopropanol and n-butanol. Methanol and ethanol are preferred on the basis of their price and availability. Other organic materials mixed with the alcohol in limited quantities such as heptane, toluene, benzene or acetone employed as a denaturant for ethanol are not harmful. Up to about 25 percent water can also be present if desired to increase the solubility of some of the cellulose derivatives and to lower the burning rate.

The gelled alcohol compositions find utility as solid or semi-solid fuels for use with, e.g., warming trays or chafing dishes. Due to the gelling, the burning rate of the alcohol is significantly lowered, without reducing its heat of combustion. Moreover, the presence of the olefin-modified hydroxyalkyl cellulose which is substantially completely combustible adds to the heat of combustion of the composition. The compositions are easily extinguished by simply cutting off their oxygen supply.

The gels can also be employed for low level lighting in applications where candles or alcohol lamps are presently employed. Another use is in flares, They can also be employed for decorative purposes where one simply wishes to have a controlled, low level flame and is not concerned with the amount of light created.

In connection with the latter utility the decorative quality can be enhanced by adding to the gels small amounts of chemicals which form colored flames on burning. Normally, this effect is created by means of inorganic compounds such as salts or by organometallics. For example, a boron salt will produce a brilliant blue flame, a strontium or lithium salt will produce red, a barium salt will produce green and a sodium salt will produce yellow. The inorganic compound can be added in concentrations of up to about 10% based on the weight of the alcohol.

In addition to eliminating the hazards involved in handling nitrocellulose, this invention also makes it feasible to prepare gels with significantly less thickener than has been the case in the prior art. Using nitrocellulose as the thickener, a la the prior art, a concentration of at least about 2% thickener was found necessary. As indicated hereinabove, substantially lower concentrations of the crosslinked cellulose derivative are sufficient according to this invention.

A further advantage of the gelled fuels according to this invention is that they are extremely stable. Upon sitting for several months, even at low temperatures these gels exhibit no syneresis. Accordingly, there is no waste of the alcohol and more importantly, no flash hazard as no free alcohol is squeezed out of the gel on sitting.

Yet another advantage of these gels is the substantial absence of noxious or unpleasant combustion products. This is in contrast to more conventional gel fuels based on nitrocellulose which produce oxides of nitrogen on burning.

The invention is illustrated by the following example. Parts and percentages are by weight unless otherwise indicated.

EXAMPLE 1 TO 3

Three solutions were prepared by dissolving, in about 80 parts of methanol, 1 part of allyl hydroxypropyl cellulose having a hydroxypropyl M.S. of about 4 and an allyl D.S., respectively, of 0.165, 0.255, and 0.315. To each of these three solutions was added about 0.02 part of dichloroglyoxime with stirring to effect complete and unfirom dissolution. When dissolution was complete, about 0.05 part of sodium bicarbonate was added. The three solutions were poured into metal cups and set to firm gels within 30, 7, and 7 minutes, respectively. The three gels were of about the same consistency, i.e., rubbery.

These gels were ignited. Each burned smoothly with a substantially soot and smoke-free flame, leaving very little residue after burning.

EXAMPLE 4

Using the allyl hydroxypropyl cellulose of Example 3 (hydroxypropyl MS = 4, allyl D.S. = 0.315) one part thereof was dissolved in about 80 parts of 95 percent ethyl alcohol. To this was added with moderate agitation, about 0.02 parts of sodium bi-carbonate. With continued agitation about 0.01 part of dichloroglyoxime was then added. Gelation occurred in about 10 minutes. The gel were clear, stiff and rubbery.

EXAMPLE 5

The procedure described in Example 4 was repeated using methanol as the solvent and about 1.0 part of triethyl borate was also added. Here again, gelation occurred in about 10 minutes to form a rigid gel. This gel burned with a brilliant blue, smoke- and soot-free flame.

When lithium chloride was added in place of the triethyl borate, similar gelling results were observed. This composition burned with a brilliant red flame.

EXAMPLE 6

In this example, a gel was prepared using allyl-modified hydroxyethyl cellulose having an allyl D.S. of 0.15 and a hydroxyethyl M.S. of 2.7. To 50 cc of a 1 percent solution of the modified hydroxyethyl cellulose in 80 percent methanol was added 0.005 gram of dichloroglyoxime and 0.01 gram of sodium bicarbonate (as a 5% aqueous solution). Within 30 minutes a stiff, rubbery gel had formed. This gel burned readily with a colorless, soot-free flame. Substantially no residue remained on completion of burning.

EXAMPLE 7

In this example a gel was prepared using vinylbenzyl-hydroxypropyl cellulose having a vinylbenzyl D.S. of about 0.25 and a hydroxypropyl M.S. of about 4. A 1 percent solution of the vinylbenzyl hydroxypropyl cellulose was prepared in 95 percent ethanol and to 50 cc of this was added with stirring 0.005 gram of dichloroglyoxime and 0.01 gram of sodium bicarbonate (5 percent aqueous solution). Gelling took place within about 30 minutes to form a dry, rubbery gel. This gel burned readily with a colorless, soot-free flame leaving substantially no residue.

EXAMPLE 8

One-half gram of allyl HPC, allyl D.S. 0.20, hydroxypropyl M.S. 4.0 in 40.5 g 92 percent ethanol (by weight) was stirred at room temperature. To this was successively added 0.4 ml 5 percent aqueous $NaHCO_3$ and 0.0075 g terephthal-bis (hydroximoyl chloride) as a solution 0.1 g/ml in tetrahydrofuran. On standing overnight (16 hours) without agitation, a rigid gel was obtained. This gel burned quite readily with a smoke-free flame.

What I claim and desire to protect by Letters Patent is:

1. A gelled composition comprising an aliphatic alcohol having about one to five carbon atoms and containing about 0.2 to 2 percent by weight of an olefin-modified hydroxyalkyl cellulose which has been crosslinked through the olefin group.

2. The gelled composition of claim 1 wherein the aliphatic alcohol is selected from the class consisting of methyl and ethyl alcohol.

3. The gelled composition of claim 2 where the olefin-modified hydroxyalkyl cellulose is allyl hydroxyethyl cellulose.

4. The gelled composition of claim 2 where the olefin-modified hydroxyalkyl cellulose is allyl hydroxypropyl cellulose.

5. The gelled composition of claim 1 including about 1 to 10% by weight of an inorganic compound which produces a colored flame.

6. A gelled composition comprising an aliphatic alcohol having one to five carbon atoms and containing about 0.2 to 2 percent by weight of an olefin-modified hydroxyalkyl cellulose which has been crosslinked with about 0.2 to 10 percent based on the weight of said cellulose of a polyfunctional nitrile N-oxide.

7. The gelled composition of claim 6 wherein the nitrile N-oxide is cyanogen N,N'-dioxide.

8. The gelled composition of claim 7 wherein the olefin-modified hydroxyalkyl cellulose is hydroxypropyl cellulose and the aliphatic alcohol is selected from the class consisting of ethyl and methyl alcohol.

9. The gelled composition of claim 8 wherein the olefin-modified hydroxypropyl cellulose is allyl hydroxypropyl cellulose.

10. The gelled composition of claim 6 including about 1 to 10 percent by weight of an inorganic compound which produces a colored flame.

* * * * *